(12) United States Patent
Krajec (10) Patent No.: US 8,204,949 B1
(45) Date of Patent: Jun. 19, 2012

(54) EMAIL ENABLED PROJECT MANAGEMENT APPLICATIONS

(76) Inventor: Russell Krajec, Loveland, CO (US)

(*) Notice: Subject to any disclaimer, the term of this patent is extended or adjusted under 35 U.S.C. 154(b) by 0 days.

(21) Appl. No.: 13/247,276

(22) Filed: Sep. 28, 2011

(51) Int. Cl.
*G06F 15/16* (2006.01)
*G06F 7/04* (2006.01)
*G06F 17/00* (2006.01)

(52) U.S. Cl. ............................ 709/206; 726/2; 715/209
(58) Field of Classification Search .................. 709/206; 715/209; 726/2
See application file for complete search history.

(56) References Cited

U.S. PATENT DOCUMENTS

| | | | | |
|---|---|---|---|---|
| 6,728,733 | B2 * | 4/2004 | Tokui | 1/1 |
| 2001/0029510 | A1 * | 10/2001 | Tokui | 707/200 |
| 2002/0026521 | A1 * | 2/2002 | Sharfman et al. | 709/231 |
| 2003/0046345 | A1 * | 3/2003 | Wada et al. | 709/205 |
| 2003/0135565 | A1 * | 7/2003 | Estrada | 709/206 |
| 2004/0139400 | A1 * | 7/2004 | Allam et al. | 715/526 |
| 2004/0143472 | A1 * | 7/2004 | Estrada et al. | 705/8 |
| 2005/0039131 | A1 * | 2/2005 | Paul | 715/730 |
| 2005/0198612 | A1 * | 9/2005 | Gonzalez | 717/101 |
| 2006/0031078 | A1 * | 2/2006 | Pizzinger et al. | 705/1 |
| 2007/0038494 | A1 * | 2/2007 | Kreitzberg et al. | 705/8 |
| 2007/0150296 | A1 * | 6/2007 | Ramcharran et al. | 705/1 |
| 2007/0220014 | A1 * | 9/2007 | Emling et al. | 707/10 |

* cited by examiner

*Primary Examiner* — Ranodhi Serrao
(74) *Attorney, Agent, or Firm* — Krajec Patent Offices, LLC; Russell S. Krajec (57) ABSTRACT

A web application for managing multiple matters may have an email interface that may be used to update status items as well as upload and categorize documents. The web application may authenticate the source of the information, and may apply the various input received via email to an appropriate matter. The email interface may generate email queries for users, and the queries may include various identifiers that may be used to apply a response to the appropriate matter. The email interface may allow a user to create new matters or activities within matters. An email's subject line, contents, attachments, or other information may be analyzed.

10 Claims, 5 Drawing Sheets

EMAIL ENABLED PROJECT MANAGEMENT APPLICATIONS

BACKGROUND

Interfacing to various web applications can be tedious and time consuming. A typical web application interaction may involve accessing the application with a web browser, authenticating to the application, and navigating a series of screens to find a screen to update data, for example.

SUMMARY

A web application for managing multiple matters may have an email interface that may be used to update status items as well as upload and categorize documents. The web application may authenticate the source of the information, and may apply the various input received via email to an appropriate matter. The email interface may generate email queries for users, and the queries may include various identifiers that may be used to apply a response to the appropriate matter. The email interface may allow a user to create new matters or activities within matters. An email's subject line, contents, attachments, or other information may be analyzed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A project management system may have an email interface for disseminating and collecting data from users. The system may generate emails for collecting specific types of information, as well as accept emails that can be applied to specific projects or matters being managed.

The email communication may be one mechanism by which the system may disseminate assigned tasks to users and collect data about those tasks. The system may evaluate incoming emails to determine the status of activities or tasks, as well as to upload and store attached files for the project or matter being managed.

The project management system may also include a web based or other user interface through which a user may update the various projects. The user interface may include an update screen whereby the user may change the status of the project, as well as manually upload any files relating to the project. The email communication mechanism may allow the user to simply send an email to the system and not have to use the manual user interface.

When a user interacts with the system using email, the system may authenticate users in several different manners. In some cases, the system may authenticate a user based on their email address. Some embodiments may authenticate using the sender's email address, as well as some other code, indicia, or other information that may be included in the contents of an email. Still others may pass an encrypted key or other identifier along with the email as a source of authentication.

The project management system may manage multiple matters, each of which may have various activities, tasks, documents, or other information. In many systems, certain users may be assigned one or more roles with each matter, and some users may have access to certain matters but not others. A user's assignments to different matters and roles may be used to determine how the user's emails may be processed when received by the system.

In some cases, an email received by the system may process the email to make a change to a matter. In other cases, an email may be received, categorized, and stored, but may not implement a change until the same user or another user approves the change by accessing the system's web interface after full authentication.

An example of a type of project management system may be a docketing system that monitors multiple projects, such as legal cases. A docketing system may have many matters, each of which may have various associated activities. The docketing system may email reminders to attorneys, paralegals, or other users, and the users may respond to the reminders using reply email. The docketing system may process the reply email to authenticate the user, determine to which matters the email refers, and update the matter with data in the reply email.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
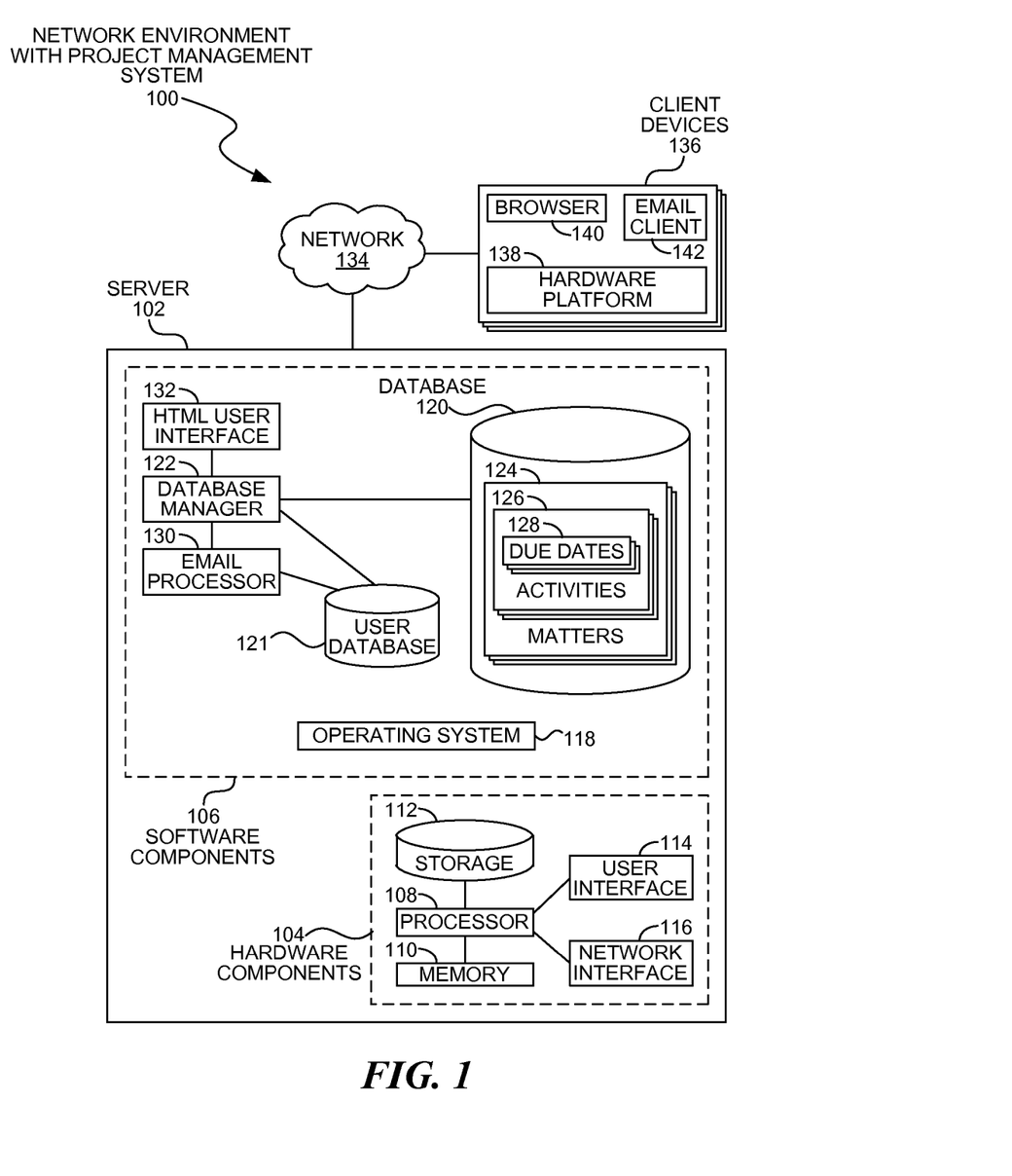
FIG. 1 is a diagram of an embodiment showing a network environment with project management system.

FIG. 1 is a diagram of an embodiment 100, showing a server 102 that may provide a project management or docketing system as a web and email service. Embodiment 100 is a simplified example of a network environment in which client devices may access a web service that provides a project management service.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 may be a system that provides a project management application that is accessed through a user interface, such as web browser, and email system. The project management application may manage individual projects, called matters, and each matter may have several associated activities. The activities may be assigned to various people, and the system may provide a to-do list and reminders to the users.

In one embodiment, the project management application may operate as a docketing system for legal matters. A docketing system may track individual cases and the activities associated with the cases. In many systems, the docketing system may be a main repository for a case, and may store all documents for a matter in electronic form.

The project management system may allow users to interact using email. In a typical exchange, the project management system may send a reminder email to a user. The user may reply to the email and update the status of the activity, as well as attach documents to be uploaded and stored in the system.

The email processor may use various clues in the user's email to determine which matter and which activity in the matter that the email refers. In the case of a system-generated reminder, the initial email may include indicia that may be read when the email reply is received by the system. The indicia may be an identifier in a subject line, a statement in the body of the email, or other identifier.

In some cases, a Globally Unique Identifier (GUID) or other unique identifier may be created for the email. Such an identifier may be used by the system to identify the specific item being updated. The identifier may identify the user, matter, activity, document, or other item.

Some embodiments may embed a GUID or other identifier into a document that may be associated with a particular matter, activity, task, or user. The identifier may be embedded in the document as metadata or as some other part of the document. When the document is received in an email, the system may identify the matter, activity, task, user, or other item from the document and process the email accordingly.

The email processor may eliminate the user having to open a browser, call up the application, authenticate, and navigate through the application to a specific data item to update. For complex applications, such an email processor may eliminate much of the tedium of interacting with the application.

For many project management applications, the accuracy of the data is important to managing many projects, as well as complex or large projects. When the interactions are simple and easy, the interactions are much more likely to happen often and efficiently. The email interface may be less time consuming and frustrating than manually updating the project. With more accurate and timely data, the overall system may be more effective and useful.

In many embodiments, the system may store the documents with metadata that may be derived from an associated activity, task, or other item in the database. Using an example of a patent docketing system, a work task of responding to an Office action may be assigned. When a user responds to the task and attaches a document to a response email, the system may tag the document with metadata from the task. For example, the metadata may include a matter identifier, due dates for the task, the task description, or other metadata. These metadata may be used by the system for organizing and retrieving the documents, as well as other uses.

The system may derive data or metadata from an attached document to update various activities, tasks, or other items in the database. For example, a document attached to an email may include a matter identifier, activity identifier, or other The system of embodiment 100 is illustrated as being contained in a single server 102. The server 102 may have a hardware platform 104 and software components 106.

The server 102 may represent a server or other powerful, dedicated computer system that may support multiple user sessions. In some embodiments, however, the server 102 may be any type of computing device, such as a personal computer, game console, cellular telephone, netbook computer, or other computing device.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface devices 114. The user interface devices 114 may include keyboards, monitors, pointing devices, and other user interface components.

The hardware platform 104 may also include a network interface 116. The network interface 116 may include hardwired and wireless interfaces through which the system 102 may communicate with other devices.

Many embodiments may implement the various software components using a hardware platform that is a cloud fabric. A cloud hardware fabric may execute software on multiple devices using various virtualization techniques. The cloud fabric may include hardware and software components that may operate multiple instances of an application or process in parallel. Such embodiments may have scalable throughput by implementing multiple parallel processes.

The software components 106 may include an operating system 118 on which various applications may execute. In some cloud based embodiments, the notion of an operating system 118 may or may not be exposed to an application.

The software components 106 may include a database 120 which may contain information about the projects to be managed. A database manager 122 may be an application that runs queries against the database 120, and allows interaction to the database 120 through an HTML user interface 132.

Figure 2:
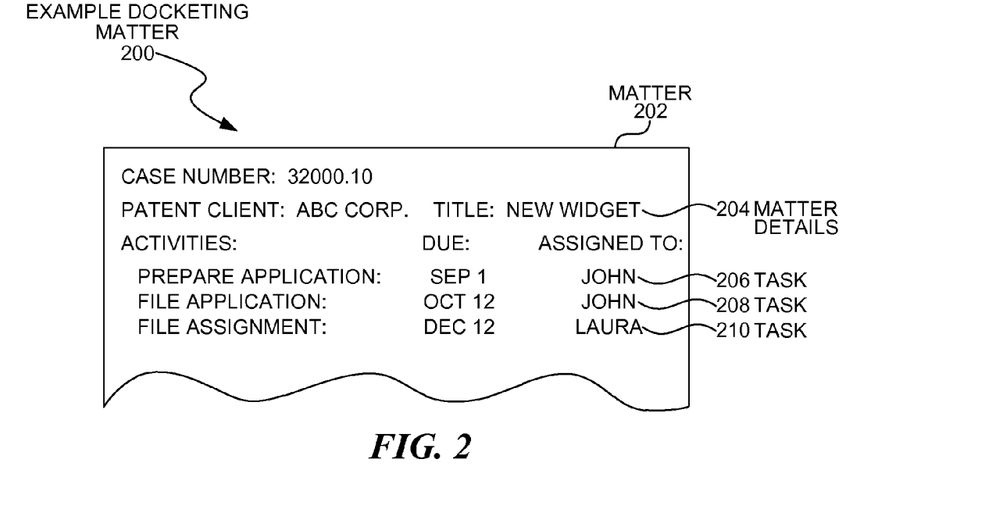
FIG. 2 is a diagram illustration of an example embodiment showing a docketing matter.

The database 120 may manage projects as matters 124 for which one or more activities 126 may be assigned. Each activity 126 may be a task, work item, or other element that may be tracked using due dates 128. A simplified example of a docketing system with matter and activities are illustrated in embodiment 200 later in this specification.

An email processor 130 may receive emails from users and cause the database manager 122 to update the database 120. The emails may contain references to specific matters and, in some instances, to specific activities. The email processor 130 may enable a user to update a specific matter and activity with a simple email message.

The email processor 130 may authenticate the sender using several different methods. In a simple method, the sender's email address may be compared to a user database 121 to determine if the user is valid. Such a method may be able to be spoofed by changing a user's email address, but may be useful in cases where the risk of spoofing is low. Other methods may also verify an address or identifier of the user's device, such as an Internet Protocol (IP) address, Media Access Control (MAC) address, Electronic Serial Number (ESN), or any other device identifier. When such methods are used, the user database 121 may include one or more device identifiers that may be associated with a user.

In some embodiments, a user may be authenticated by replying to an email generated by the system. Such an email may include unique identifiers, such as Globally Unique Identifiers (GUID) or other codes that may be unlikely to be duplicated. In such embodiments, an email may be generated by the system for a specific use, such as to update a specific activity, task, or matter. When the email is replied to and returned to the system, the email processor may recognize the original email and thereby authenticate the user. Some embodiments may authenticate the user when the original email is returned only by those users who are also permitted to access the matter being updated.

Some embodiments may authenticate a user by examining an attachment to an email. The attachment may have an identifier, such as a GUID, matter number, or other identifier that may be examined by the system. The system may be able to identify the attachment by a filename or other metadata. In some embodiments, the system may examine the contents of the file to find an identifier. The identifier may be used to authenticate the user as well as identify a matter, task, activity, or other item associated with the attachment.

The information being stored and updated in a project management application, such as a legal docketing application, may be sensitive or restricted information. In a legal docketing application, the information may be protected by attorney/client privilege, may contain important company trade secrets, or may be other sensitive information used for litigation or negotiation. As such, authenticating users who interact with the system can be an issue when deploying the system.

In some cases, each email transmitted by a user to the system may include a shared secret that may authenticate the email. The shared secret may be a cryptographic key, such as a public key issued to the user.

In some embodiments, the shared secret may be a file that may be issued by the server and stored locally on the user's client device. In such embodiments, the user may attach the shared secret file to any email sent to the server and the server may authenticate the user based on the attachment.

Some embodiments may accept and authenticate email from users where the email is encrypted. In one embodiment, the email may be encrypted by the user with the user's private key so that the server may decrypt the email using the user's public key and thereby authenticate the user. Some such embodiments may additionally encrypt the email using the server's public key so that only the server may decrypt the email. Such a system may prevent an email being read by an unauthorized person who may intercept the email in transit.

The user database 121 may include records of various users associated with the system. Some of the users may have permission to update the database 120 via email, while other users may not.

In some embodiments, different users may be given different access permissions or assigned different roles with different matters. Using a legal docketing system example, a specific paralegal or attorney may be granted access to some of the matters but not others in the system. For some matters, the person may be granted read only access that may be useful for monitoring or managing a matter, but the same person may be granted read/write access to other matters for which the person may be responsible or have a more active role.

In such embodiments, when a person attempts to update the database 120 through an email, the user database 121 may be consulted to determine whether or not the person has permission to perform the operation. If the user does not have permission, the input may be denied and a response email may be sent to the user explaining that their input was not accepted. In some cases, the system may not send an email response, which may lessen the opportunity for malicious persons to obtain information about the system.

The server 102 may be connected to a network 134 to various client devices 136. The network 134 may be any type of network, such as a local area network, wide area network, or the Internet. In some cases, the network 134 may include wired or wireless connections and may transmit and receive information using various protocols.

The client devices 136 may have various hardware platforms 138 on which a browser 140 and email client 142 may execute. The browser 140 may be used to access the HTML user interface 132 of the database manager 122, and may be the primary mechanism for accessing the project management application.

The email client 142 may be an application through which a user receives, creates, and sends email messages. In some cases, the email client 142 may store and retrieve messages, as well as perform other functions. In some cases, the email client 142 may be a web application that may operate on another server and may be accessed using a browser 140.

The client devices 136 may be any type of computing device on which a browser or email client may operate. Examples of such devices may be desktop computers, laptop computers, tablet computers, mobile telephones, game consoles, network appliances, or any other device.

FIG. 2 is an example illustration of an embodiment 200 showing a docketing matter. Embodiment 200 illustrates a simplified example of a patent matter that may be managed by a project management system such as illustrated in embodiment 100. Embodiment 200 may show a user interface in which a patent matter is displayed.

The matter 202 may illustrate a patent application matter. Embodiment 200 illustrates a patent application that may be prepared for a client. The patent application may be considered a 'project' for the project management system. Several different people may be assigned to the project, each of which may perform different activities.

The project management system may manage many different such matters and may enable managers to allocate resources to various matters, retrieve status updates of the progress of matters, and manage the progress of the matters. The system may also act as a to-do list for the various people assigned to matters. As such, the system may generate a list of tasks that are due, along with the due dates, and send reminders to the users. The users may update the tasks themselves or may have an administrative professional perform the update. In many cases, the responsible person may update a task status by sending an email to the project management system with the status update.

The patent application may have several matter details 204 that define a case number, a client, a title, and other details of the matter. For this particular matter, there are several activities and tasks assigned to people. Task 206 may be to prepare an application, which may be due September 1 and may be assigned to John. John may also be assigned the task 208, which may be to file the application and that task may be due October 12. Finally, task 210 may be to file an assignment, which may be assigned to Laura and due December 12.

In the example of embodiment 200, the matter 202 may have several tasks that are assigned to different people. The system may generate a to-do list for John that includes preparing and filing an application, and a separate to-do list for Laura that only has filing an assignment. In many cases, both John and Laura may be granted access to read the various tasks. Some embodiments may permit either John or Laura to update any of the tasks via email or by manually changing the tasks with a user interface. Other embodiments may permit email updates to be made only by persons to whom the task responsibility has been assigned. In some cases, some users may only be able to update their assigned tasks, while other users may be able to update all tasks via email.

Figure 3:
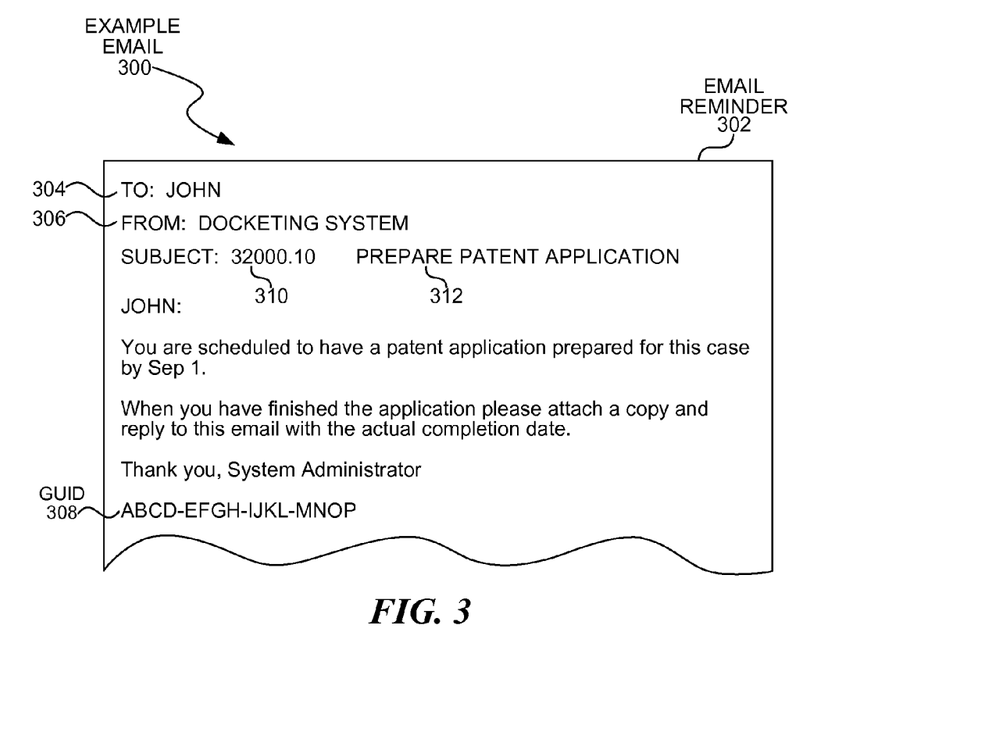
FIG. 3 is a diagram illustration of an example embodiment showing an electronic mail sent by a docketing system.

FIG. 3 is an example illustration of an embodiment 300 showing an email that may be generated by a project management system. The email 302 may be an example reminder email that may be sent to a user assigned to a task.

The example of embodiment 300 uses the task 206 of embodiment 200 where John is assigned the task of preparing a patent application.

The email 302 is sent to John at line 304 from the docketing system at line 306. The subject of the email may include both a case number reference 310 and a task reference 312.

In the body of the email, the task is explained and the due date given. The body of the email may include instructions for updating the task via email. The instructions may have the recipient reply to the email and attach a document. In this example, John may be asked to attach a copy of a draft patent application.

The email 302 may include a GUID 308 or other unique identifier. The GUID 308 or other identifier may be used by an email processor to determine which matter and task the email may relate.

Figure 4:
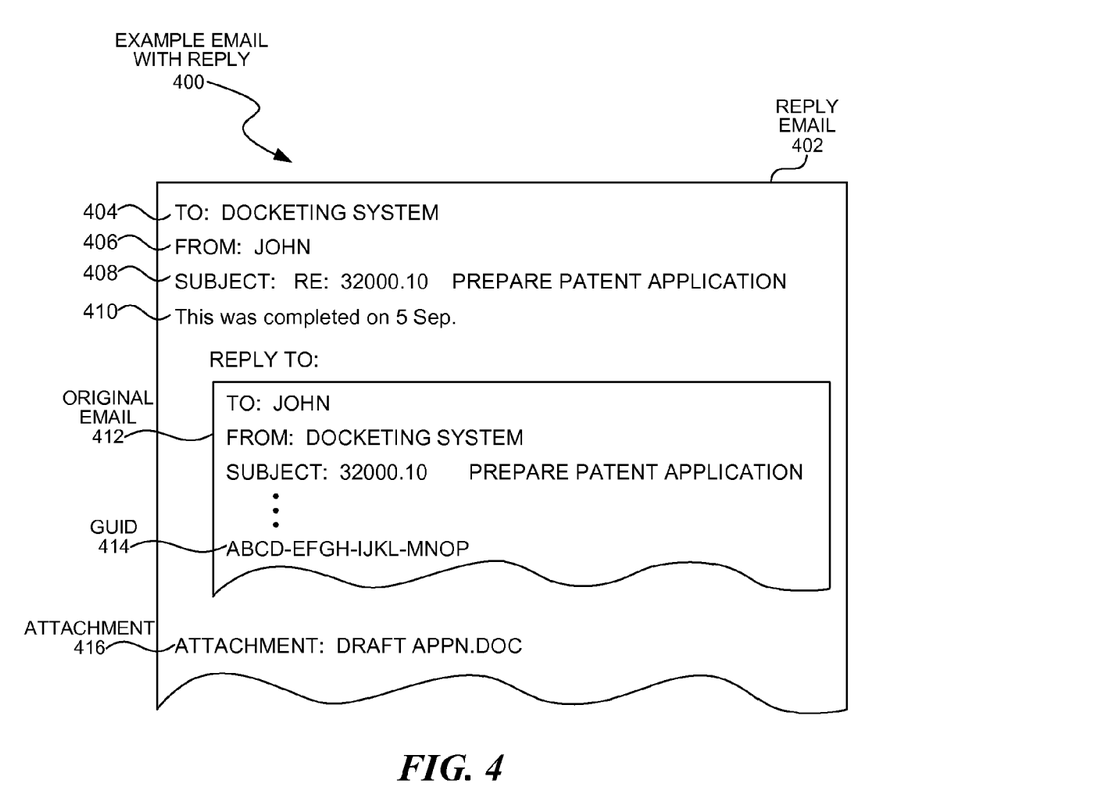
FIG. 4 is a diagram illustration of an example embodiment showing an electronic mail sent to a docketing system.

FIG. 4 is an example illustration of an embodiment 400 showing a reply email that may be generated by a user in response to the email of embodiment 300. Embodiment 400 continues the example of embodiment 300.

A reply email 402 is sent to the docketing system at line 404 from John at line 406. The subject line 410 of the email may include both the case number and task reference as in embodiment 300. In many email clients, a reply to a received email may generate a new email that may or may not update the subject line to prefix "re:".

The free text 410 may include a statement by the user that the task was completed with a date. In some embodiments, a parser may attempt to parse any free text that is included with the email as input to the specific activity or task that may be open.

As part of the reply, the original email 412 may be attached. The original email may include a GUID 414 that may be read by an email processor to authenticate the user, as well as determine a matter and activity to apply the response.

In many embodiments, a user may be able to include an attachment 416 that may be uploaded to the database and associated with the matter, activity, or task.

In some embodiments, a user may be posed a question in the body of an email sent from the system. The question, or a series of questions, may solicit information that may be updated to the system. In such cases, the user may reply to the email with a copy of the original email, and then add a response for each question by editing the copy of the original email and placing the response nearby the question.

For example, the original email from the system may include a question, such as "When was this task completed?" The user may reply to the original email and edit the text of the original email to add a date. For example, the user may add a date to the same line or the next line as the original question, so that the edited line says "When was this task completed? September 5".

The attachment 416 may be any type of file or document that may be uploaded into the system. In many project management systems, status reports, work product, or other documentary information may be stored in the system for later reference.

In some cases, one or more of the attachments 416 may be used to help authenticate a user, as well as determine which matter and activity the email may refer. Some embodiments may have a key, tag, or other identifier that may be created by the user's device or for the user's device that may be recognized by the system as belonging to the user. Such identifiers may be stored in a file format that may be attached to an email sent by the user to the system and used for authentication. In some cases, the attachment may also specify the matter and activity related to the email.

In one such embodiment, an application operating on a client device may create a tag that identifies the user, matter, and activity. Such an application may have a database that includes identifiers for various matters and activities in the main database. The identifiers may include indexes or other pointers in the main database that may not be user accessible. The application may allow the user to select the matter and activity from the local database and generate a tag file. The tag file may be encrypted or otherwise obfuscated so that the tag file may not be altered or changed.

In some embodiments, an email from a user may cause a new matter to be created or a new activity or task to be created within a matter. In such cases, the email may contain a reference to a matter or task that is not currently in the main database. The email processor may identify that the email refers to a new matter or task and may cause the new matter or task to be created.

After the reply email 402 is received and processed by the email processor, the email processor may send a response or verification email to the user. The verification email may list each item that was performed when the user's email was processed so that the user may see how the email was interpreted. The user may be able to identify any misinterpreted data and may be alerted to data that appears to be inconsistent.

In some embodiments, the user may be required to verify the interpretation of the reply email 402 prior to committing the changes to the database. In such an embodiment, the email processor may interpret the reply email 402 and generate a response with the items that will be updated into the database. The user may verify the response by replying to the response email to commit the changes to the database. The user may be able to update or correct any improper interpretations of the reply email 402. Such an embodiment may be useful in cases where the reply email may have ambiguity or where the actions of the reply email fall outside the bounds of an expected reply.

For example, an original email may request a document for upload for a specific task as well as request a completion date. If the user replies with a reply email that includes a date of the current date or a past date, along with the requested document for uploading, the email processor may determine that the task is completed and may upload the document to the database. If the user replies with a future date and does not include the requested document, the email processor may interpret the email as a request to change a due date for the activity. In such a case, the system may send a reply email asking if the user intends to change the due date and may request a reason or explanation for the change. The user may then reply to the verification email either confirming or denying the interpreted change, and including a reason or explanation if the interpretation is correct.

Figure 5:
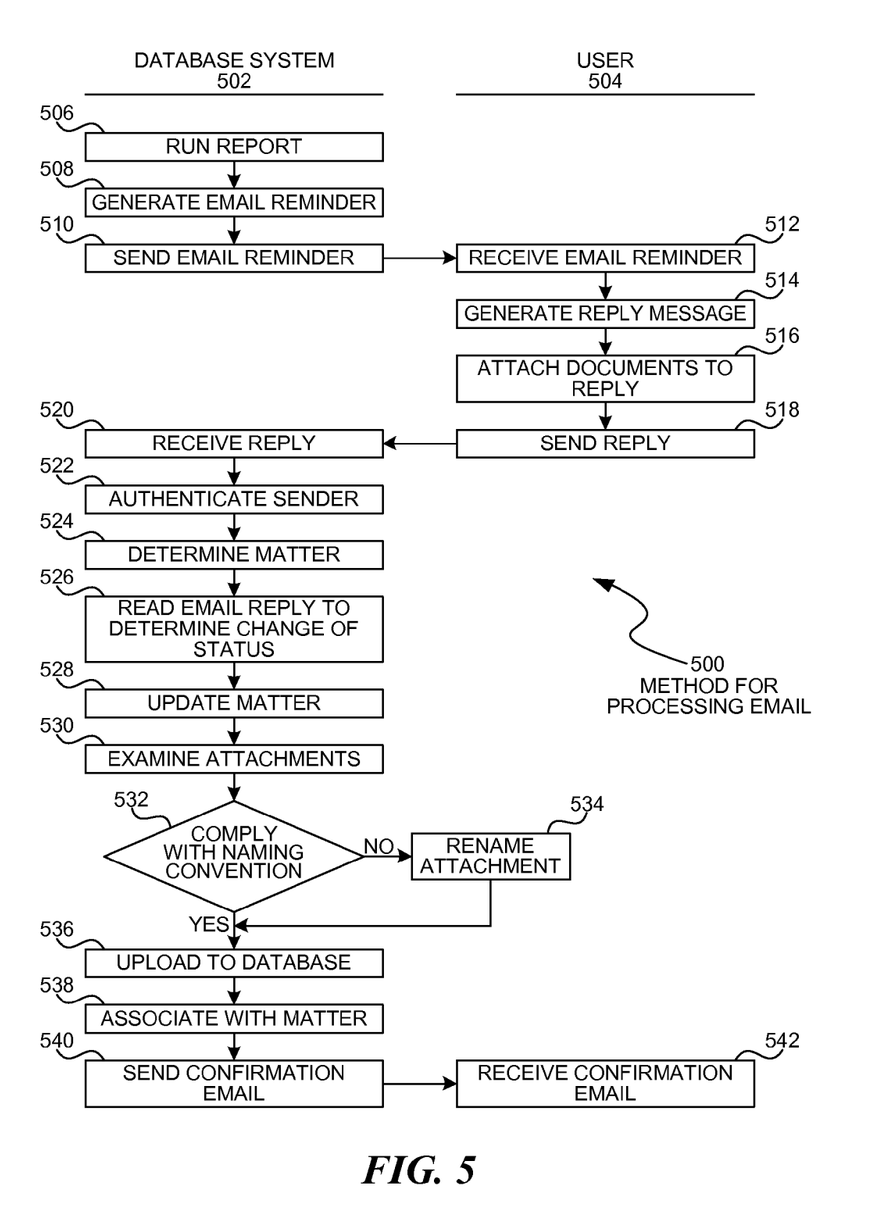
FIG. 5 is a timeline illustration of an embodiment showing a method for processing email.

FIG. 5 is a timeline illustration of an embodiment 500 showing a method for email communication between a database system 502 and a user 504. The operations of the database system 502 are illustrated in the left hand column and the operations of the user 504 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a simplified example of an interaction between a database system 502 and a user 504. The database system 502 may be a project management system, such as a docketing system, that may generate emails for the user 504. The user 504 may receive the emails using a client device with an email application, and may respond to system's emails with updates that may be processed by the system and used to update the database.

The database system 502 may run a report in block 506 that may be used to generate email reminders in block 508. An email reminder may be transmitted in block 510 to the user 504, who may receive the email in block 512.

The user 504 may generate a reply email in block 514, attach documents to the reply in block 516, and send the reply in block 518.

The database system 502 may receive the reply in block 520 and authenticate the sender in block 522. The matter may be determined from the email in block 524 and the email may be read in block 526 to determine change of status for the matter. The matter may be updated in block 528.

Any attachments may be examined in block 530 to determine if the attachments comply with a naming convention in block 532. If the attachments do not comply with the naming convention in block 532, the attachments may be renamed in block 534. The attachments may be uploaded to the database in block 536 and associated with the matter in block 538.

After completing the update, the database system 502 may send a confirmation email in block 540, which may be received in block 542.

In some embodiments, the database system 502 may send an attachment to the user 504 in the email reminder. For example, the database system 502 may create a document from a template, where the document has certain fields populated from the database. The document may then be customized for a specific activity or task.

When an attached document may be customized for a specific activity or task, the system may examine the attached document in blocks 524 and 526 to determine the associated matter, activity, task, status, or other information. In one such embodiment, the document created by the system may have a GUID or other identifier embedded in the document or associated metadata. The GUID or other identifier may be examined by the system in blocks 524 and 526 to determine the matter, activity, task, status, or other information used to update the matter in block 528.

Figure 6:
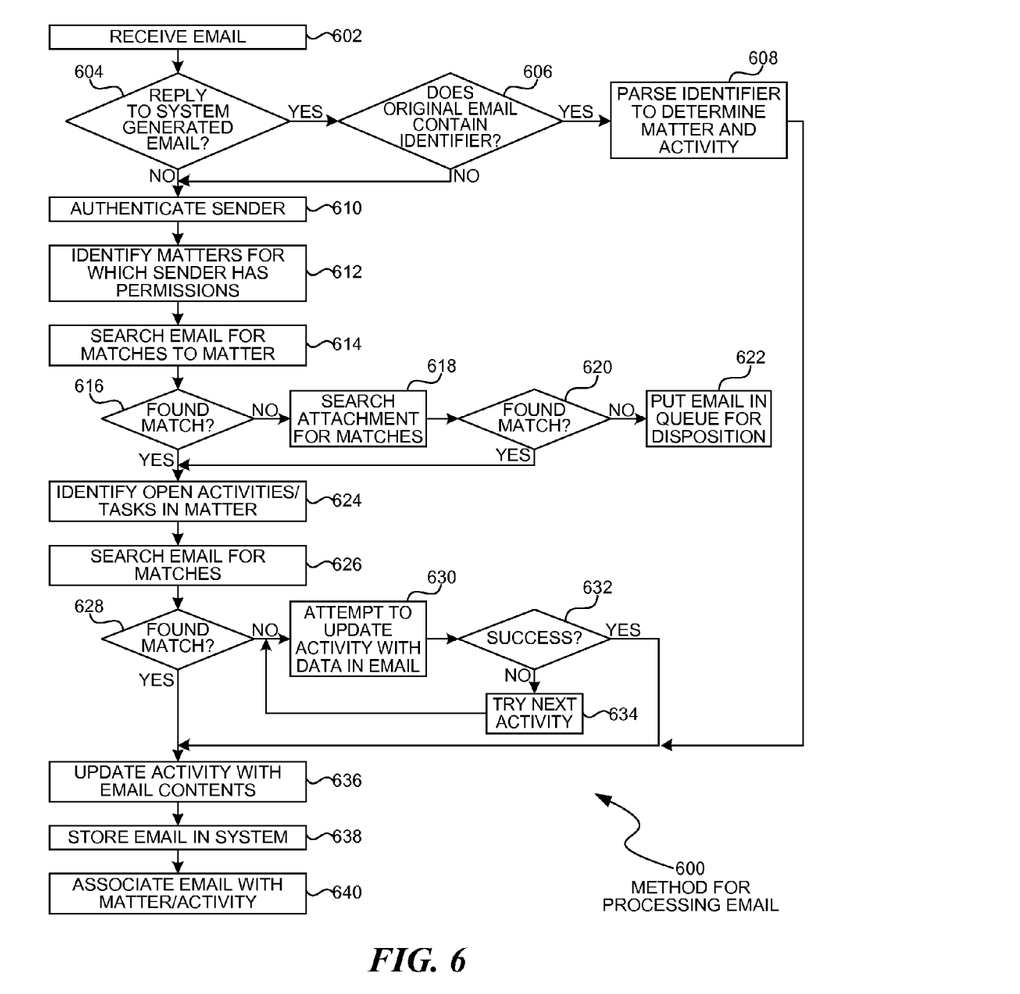
FIG. 6 is a flowchart illustration of an embodiment showing a method for processing email.

FIG. 6 is a flowchart illustration of an embodiment 600 showing a method for processing email by an email processor at a database application. Embodiment 600 illustrates some of the operations that may be performed by an email processor, such as email processor 130 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates some of the operations that may be performed by an email processor to authenticate a sender, determine a matter and activity to which the email refers, and perform updates to the matter and activity. The email may or may not be a reply to a system generated email.

In block 602, the email may be received. If the email is a reply to a system generated email in block 604, and the original email contains a unique identifier in block 606, the identifier may be parsed to determine a matter and activity in block 608. The parsing may be examining the identifier to extract information embedded in the identifier, or may involve looking up the identifier in a database of GUIDs or other identifiers to determine the matter and activity.

Embodiment 600 is configured to authenticate the sender when the sender replies to a system generated email. Other embodiments may perform additional authentication when receiving an email.

If the email is not a reply to a system generated email in block 604 or the system cannot determine which system generated email is referred to in block 606, the system may use an algorithm to determine which matter and activity the email refers. The process may start by authenticating the sender in block 610.

If the email is a reply to a system generated email in block 604 and the email is successfully parsed in block 608, the process may jump ahead to block 636 to update the activity.

Based on the sender's identity, the system may identify matters for which the sender has permissions in block 612. The email from the sender may be examined in block 614 to find any identifiers that may match the user's matters. If there is no matches in block 616, any attachments may be searched in block 618 and, if a match is not found in block 620, the email may be put in a queue for manual examination and disposition in block 622.

The manual examination and disposition of block 622 may involve having an administrator or other person examine the email to determine what the user intended and may cause the update to be performed. In some embodiments, the email may be placed in a queue so that the user may process the email when the user logs into a web site to access the database application.

If a matter is determined from the email in block 616 or from the attachments in block 618, any open activities or tasks may be identified in block 624 and the email or attachments may be searched in block 626 for any matches.

If there are no matches in block 628, the system may recursively attempt to update the open activities or tasks. The system may attempt to update an open activity in block 630. If there is no success in block 632, another activity may be attempted in block 634 and the process may return to block 630. If there is success in block 632, the update may be applied in block 636.

The email from the user may be stored in block 638 and associated with the matter and activity in block 640. In many embodiments, the email may be used during an audit to determine how a record in the database was changed and who performed the change.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:
   receiving an email from a sender;
   authenticating said sender to an authentication database;
   identifying a first matter from said email, said email being a reply email to an original email transmitted by said matter database, said first matter being determined by evaluating said original email;
   determining that said sender has permission to update said first matter;
   looking up said first matter in a matter database, said matter database comprising matter records and activities related to said matter records;
   adding at least a portion of said email to said first matter in said database;
   determining a set of open activities for said first matter;
   evaluating the contents of said email to identify one of said open activities;
   updating said one of said open activities;
   identifying a first activity from said set of open activities by evaluating contents of said email, said first activity having a due date;
   associating an identifier with said first activity;
   updating said first activity with at least a portion of said contents, said updating comprising determining a completion date from said contents;
   said updating further comprising uploading an attached file from said email to said matter database, said attached file being associated with said first matter.

2. The method of claim 1, said original email comprising a matter identifier.

3. The method of claim 2, said identifying a first matter from said email being performed by evaluating said matter identifier.

4. The method of claim 1, said original email comprising a unique identifier.

5. The method of claim 4, said unique identifier comprising a GUID.

6. The method of claim 1, said original email being a task reminder email.

7. The method of claim 1, said first activity being identified from an activity identifier in said email.

8. The method of claim 1, said identifier contained in a subject line for said email.

9. The method of claim 1, said identifier contained in said reply email.

10. The method of claim 1, said identifier contained in an attachment to said email.

* * * * *